US012723737B2

(12) United States Patent
Stanley et al.

(10) Patent No.: US 12,723,737 B2
(45) Date of Patent: Sep. 1, 2026

(54) THERMAL LIGHT EMITTING DEVICE

(71) Applicant: 4K-MEMS SA, St-Blaise (CH)

(72) Inventors: Ross Stanley, Epalinges (CH); Matthias Imboden, St-Blaise (CH)

(73) Assignee: 4K-MEMS SA, St. Blaise (CH)

( * ) Notice: Subject to any disclaimer, the term of this patent is extended or adjusted under 35 U.S.C. 154(b) by 561 days.

(21) Appl. No.: 18/460,813

(22) Filed: Sep. 5, 2023

(65) Prior Publication Data

US 2024/0084997 A1 Mar. 14, 2024

(30) Foreign Application Priority Data

Sep. 5, 2022 (EP) .................................... 22193994

(51) Int. Cl.
*F21V 5/04* (2006.01)
*F21V 9/08* (2018.01)
(Continued)

(52) U.S. Cl.
CPC .................. *F21V 5/04* (2013.01); *F21V 9/08* (2013.01); *H05B 3/0033* (2013.01); *H05B 3/84* (2013.01);
(Continued)

(58) Field of Classification Search
CPC ...... F21V 5/04; H10H 20/855; H10H 20/856; H10H 20/853; H10H 20/819; H01K 1/04;
(Continued)

(56) References Cited

U.S. PATENT DOCUMENTS

2006/0066192 A1* 3/2006 Beeson .................. G02B 27/28 257/E33.072
2015/0009649 A1* 1/2015 Jagt .......................... F21K 9/62 362/230
(Continued)

FOREIGN PATENT DOCUMENTS

AT 519870 A4 11/2018
DE 10 2018 101974 A1 8/2019
(Continued)

OTHER PUBLICATIONS

Search Report issued in European Patent Application No. 22193994.5 dated Feb. 9, 2023.

*Primary Examiner* — Ephrem Z Mebrahtu
(74) *Attorney, Agent, or Firm* — McDonald Hopkins LLC

(57) ABSTRACT

A thermal emitter device, including a thermal emitting membrane including a surface, wherein the membrane can be heated to a thermal emission temperature so that the surface radiates IR or visible light, wherein the emissivity of the surface is lower than 0.7. A lens includes a surface facing the surface of the membrane, and has a reflectivity normal to the lens surface included in the range 4% to 40%, to partially reflect the radiated IR or visible light, wherein the distance between the lens surface and the surface is equal or lower than L/4, where L is a major length of the membrane. A part of the IR or visible light reflected by the lens is reabsorbed by the membrane, and another part of the IR or visible light reflected by the lens is reflected by the membrane toward the lens, having therefore another chance to go through the lens.

15 Claims, 7 Drawing Sheets

(51) Int. Cl.
*G02B 19/00* (2006.01)
*H05B 3/00* (2006.01)
*H05B 3/84* (2006.01)

(52) U.S. Cl.
CPC ...... *G02B 19/009* (2013.01); *H05B 2203/032* (2013.01)

(58) Field of Classification Search
CPC .... F21K 9/62; F21K 9/64; G02B 3/02; G02B 19/0066; F41J 2/02
See application file for complete search history.

(56) References Cited

U.S. PATENT DOCUMENTS

| | | | | |
|---|---|---|---|---|
| 2016/0343921 | A1* | 11/2016 | Stanley | H10H 29/14 |
| 2019/0195602 | A1* | 6/2019 | Udrea | F41J 2/02 |
| 2021/0246016 | A1 | 8/2021 | Pindl et al. | |

FOREIGN PATENT DOCUMENTS

| | | | |
|---|---|---|---|
| EP | 3595403 | A1 | 1/2020 |
| WO | 2020012042 | A1 | 1/2020 |
| WO | 2021144463 | A1 | 7/2021 |
| WO | 2021144464 | A1 | 7/2021 |

* cited by examiner

THERMAL LIGHT EMITTING DEVICE

TECHNICAL DOMAIN

The present invention concerns a thermal light emitting (thermal emitter in the following) device made from a refractory material. This device is capable of emitting broadband visible and infrared radiation at high temperatures, e.g., at temperatures higher than 1600 K and/or going up to 3000 K or more.

RELATED ART

In this context, the IR light has a wavelength belonging to the range from 0.8 μm to 12 μm and visible light has a wavelength belonging to the range 0.4 μm to 0.8 μm.

Thermal emitters for such diverse applications as for example (but not limited to) infrared spectroscopy, illumination for gas sensing, hyperspectral imaging, machine vision, are known.

Examples of known thermal emitters are described in the patent applications WO2020012042, WO2021144463 or WO2021144464 filed by the applicant.

Thermal emitters emit light according to the blackbody theory of radiation. This gives detailed information about how the emission intensity varies with temperature and wavelength.

However, no real materials are truly black, so the blackbody emissivity has to be scaled by a parameter called the emissivity, ε, which is a function of wavelength and temperature.

Most thermal emitters are based on materials which are as black as possible, i.e., which have an E at the wavelength range of interest close to 1.0. The drawback is that there are very few materials with high emissivities and in general they can only survive relatively low temperatures, i.e., to temperature below 2000 K.

Some IR thermal emitters are made from a refractory material. A refractory material is a material with a melting point above 2000 K. Examples of refractory materials are Tungsten, Titanium, Hafnium, Zirconium, Tantalum, Molybdenum and their Nitrides, Oxides and Carbides. Refractory metals are metals with a melting point above 2000 K.

At IR wavelength refractory metals are quite reflective (Reflectivity ranging from 30% to more than 99%) and the corresponding emissivity belongs in general to the range of 0.7 to 0.01. The advantage of refractory metals is that they are stable at high temperature, the disadvantage is their low intrinsic emissivity.

Flat thermal emitter devices, i.e., thermal emitter devices comprising a substantially flat emitting membrane, are Lambertian emitters. Wire thermal emitter devices are Lambertian on one axis (in general, the axis of the filament) and uniform on a second axis. For a Lambertian emitter, the majority of the power is being emitted in a cone at 45°.

A thermal light emitting device comprises in general a housing, mainly to protect the emitter from oxidation. This housing can include elements to enhance the performance of the thermal emitter in an optical system. A common issue is how to get light from the thermal emitter into the optical system. In order to use the most power possible, light at very high angles (i.e. to angles higher than 60° or lower than −60°) should be collected. It is also desirable to make the thermal emitter device as compact as possible.

A common solution, used notably for wire thermal emitter devices, is to place the thermal emitter device into a parabolic reflector. However, if the size of the parabolic reflector (or mirror) is similar to the thermal emitter device size, then shadowing occurs, i.e., the thermal emitter device itself blocks the light reflected from the parabolic reflector. Moreover, this solution is not suitable for flat thermal emitter devices. Finally, the parabolic reflector has low efficiency for collecting light from the top side of the thermal emitter device.

Another approach is just to use a lens, comprising a first lens surface and a second lens surface (opposite to the first lens surface), at least one lens surface facing one of the surfaces of the thermal emitting membrane. The lens should be very large to maximize the collected light. However, in this case, light at high angles is lost due to reflection.

By assume a Lambertian thermal membrane emitting with a random polarization, then some light is lost at the first lens surface due to reflection. Another fraction is lost at the second lens surface.

The normal way to overcome these losses is to reduce the reflections using an anti-reflective coating. Some documents disclose the use of a reflective layer placed under the membrane to improve the emissivity of the emitter (US 2021246016 A1 or AT 519870 B1) or on side walls of the emitter device (US 2019195602 A1).

However, the anti-reflective coatings are expensive, they are complicated to fabricate for wide wavelength ranges, and also have a limited range of angles over which they work. Finally, anti-reflective coatings are clearly not ideal when dealing with thermal sources, as the wavelength range is large e.g., 1 μm-3.5 μm, and the range of emitting angles is also very large (Lambertian source).

Other broadband techniques involve subwavelength structures such as the so-called "moth eye structures". Moth-eye structures are also expensive to fabricate and are generally not available in standard commercial processes.

Therefore, there is a need of a thermal emitter device where the emitted light is used as efficiently as possible and that overcomes the shortcomings and limitations of the state of the art.

SHORT DISCLOSURE OF THE INVENTION

An aim of the present invention is the provision of a thermal emitter device that overcomes the shortcomings and limitations of the state of the art.

Another aim of the invention is the provision of a thermal emitter device with improved efficiency and/or easy to fabricate.

Another aim of the invention is the provision of a thermal emitter device where the emitted light is used as efficiently as possible.

According to the invention, these aims are attained by the object of the attached claims, and especially by a thermal emitter device according to claim 1.

The thermal emitter device according to the invention comprises a thermal emitting membrane comprising a surface, wherein the thermal emitting membrane is arranged to be heated to a thermal emission temperature so that the surface radiates IR or visible light.

In this context, the term "membrane" designates an element whose thickness is lower than its other two dimensions. In this context, the term "membrane" is a synonymous of the term "(hot)-plate". In this context, a membrane is arranged to keep its own shape independently on the temperatures and it is held at several points. In other words, in this context, a membrane does not buckle nor break at high temperatures. In one preferred embodiment, the membrane is substantially planar. In one preferred embodiment, the membrane can support itself, i.e., it is structurally independent. In another embodiment, the membrane cannot support itself, unless attached on all sides.

According to the invention, the emissivity of the surface is lower than 0.7. In fact, the invention is useful for low-emissivity materials, i.e., for materials having an emissivity lower than 0.7. In other words, there is not so much interest for enhancing the emissivity of good emitter materials, i.e., of materials having an emissivity equal or higher than 0.7.

The thermal emitter device according to the invention comprises a lens, the lens comprising a lens surface, the lens surface facing the surface of the thermal emitting membrane and having a reflectivity normal to the lens surface comprised in the range 4% to 40%, so as to partially reflect the radiated IR or visible light.

In this context, the term "lens" is not necessarily a synonymous of a flat lens. In other words, a lens could be flat, or it could be not-flat, e.g. it can have a convex shape.

According to the invention, the distance between the lens surface and said one of the first or second surfaces is equal or lower than L/4, where L is a major length of the thermal emitting membrane. In other words, according to the invention the lens is placed really "close" to the thermal emitter device. In this way, a part of the IR or visible light reflected by the lens is reabsorbed by the thermal emitting membrane, and another part of the light reflected by the lens is reflected by the thermal emitting membrane toward the lens, having therefore another chance to go through the lens, thereby increasing the efficiency the thermal emitter device.

Since the efficiency is increased, then for a fixed radiance it is possible to lower the temperature. Thermal emitters operating at lower temperatures will typically have a longer operating lifetime. In other words, a user who requires a specific spectral radiance will lower the operating temperature and hence improve the lifetime.

The thermal emitter devices according to the invention are not perfect blackbodies. They have an emissivity lower than 0.7 depending on wavelength and material. This means they have a reflectivity of 30% or higher. According to the invention, the thermal emitter device is placed "close" to a partially reflective lens: therefore, a part of the emitted light goes through the lens, and another part of the emitted light will be reflected by the lens, will hit an emitter surface, and either will be reabsorbed by the thermal emitter device or will reflected by the thermal emitter device towards the lens, having then a second chance to go through the lens.

Thanks to the reflection of the thermal emitter device, there is then an improvement in transmission. Moreover, there is an additional gain, since the remaining power is not truly lost as it is absorbed by the thermal emitter device and therefore increases the efficiency of the emitter and/or its lifetime.

According to one embodiment, the thermal emitting membrane is made by or comprises a refractory material, e.g., a refractory metal, a refractory ceramic (such as carbides or nitrides) and/or an alloy of refractory metals.

According to one embodiment, the distance between the lens and the surface of the emitting membrane is equal or lower than L/8. In this embodiment, the lens is closer to the emitting membrane, thereby increasing more the efficiency and/or the lifetime of the thermal emitter device.

According to one embodiment, the lens is made of glass, silicon, sapphire, quartz, germanium, and/or a MID-Far thermal material, such as $CaF_2$, $MgF_2$, ZnSe, ZnS, NaCl.

According to one embodiment, the thermal emitter device comprises a lid and the lens is placed in or on the lid. In one embodiment, the lens is the lid.

According to one embodiment, the lens surface is a lens entry surface, the lens comprising a lens exit surface.

According to one embodiment, the lens is "thin". In this embodiment, the thickness of the lens is such that the lens exit surface is also be deemed as being "close" to the emitter surface. In this embodiment, when calculating the thickness of "thin" lens, the refraction of light in the lens material should be taken into account and the lens apparent thickness should be used.

The lens apparent thickness formula for a lens material with a given refractive index n is well known and depends on the incident angle on the lens. For an angle equal to 45°, the lens apparent thickness formula is the real thickness of the lens, multiplied by a scale factor equal to 1/sqrt(2n^2−1).

According to this embodiment, a lens is "thin" if its lens apparent thickness is less than L/4 (or L/8). In this embodiment, the distance between the lens entry surface and a (first) surface of the thermal emitting membrane, is less than L/4 (or L/8).

According to one embodiment, the lens is a flat lens. In this context, a lens is flat if both of the lens surfaces are flat and sensibly parallel.

According to one embodiment, the lens is "thick". According to this embodiment, a lens is "thick" if its lens apparent thickness is higher than L/4 (or L/8). In this embodiment, the distance between the lens entry surface and a (first) surface of the thermal emitting membrane, is less than L/4 (or L/8).

According to one embodiment, the lens exit surface is curved so as to refocus the light back to the emitter and/or for making the emission more directional.

According to one embodiment, the thermal emitter device comprises a mirror on at least a portion of the lens exit surface.

According to one embodiment, the mirror is off-axis. The lens has in general a symmetry axis. In this context, the expression "the mirror is off-axis" indicates that the symmetry axis of the lens does not pass thought the mirror.

According to one embodiment, the mirror is a cold mirror, i.e., a mirror whose reflectivity normal to the mirror surface is higher than 80% (i.e., it is a highly reflecting mirror).

According to one embodiment, the mirror comprises an opening.

According to one embodiment, the portion of the lens facing the opening has a shape different from the shape of the lens which does not face the opening, in order to control the emitted light further.

According to one embodiment, the thermal emitter device comprises a plurality of resistive arms connected to the thermal emitting membrane, wherein the thermal emitting membrane is suspended by the resistive arms, wherein the thermal emitting membrane is heated to a thermal emission temperature via said resistive arms.

According to one embodiment, the surface is a first surface, the device comprising a second surface being opposite to the first surface, wherein the thermal emitting membrane is arranged to be heated to a thermal emission temperature so that the first and second surfaces radiate thermal light, wherein the mirror faces one of the first or second surfaces of the thermal emitting membrane, wherein at least a portion of the thermal emitting membrane comprises through holes, wherein any cross section in a plan parallel to one of the first or second surfaces of the thermal emitting membrane of said holes has a maximum dimension larger than the longest wavelength of said predefined region, wherein the sum of the areas of the holes is at least 10% of the area of each of the first or second surfaces of the thermal emitting membrane.

SHORT DESCRIPTION OF THE DRAWINGS

Exemplar embodiments of the invention are disclosed in the description and illustrated by the drawings in which.

EXAMPLES OF EMBODIMENTS OF THE PRESENT INVENTION

Figure 1:
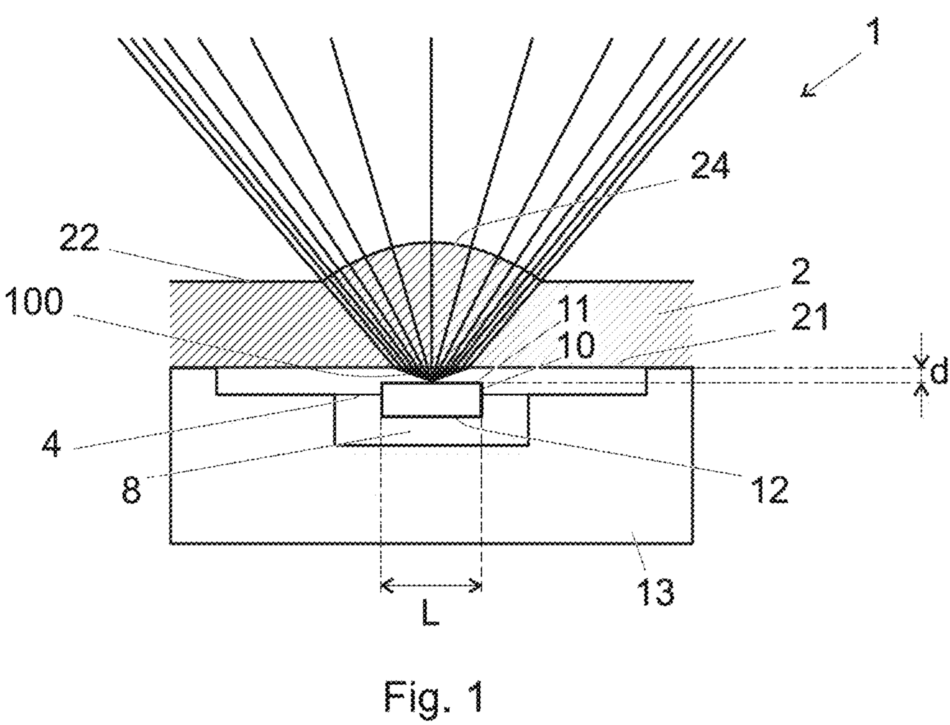
FIG. 1 illustrates a cut view of a thermal emitter device according to an embodiment of the invention.

FIG. 1 illustrates a cut section of a portion of a thermal emitter device 1 according to one embodiment of the invention. In this embodiment, the thermal emitter device 1 comprises a thermal emitting membrane 10 comprising a first surface 11 and a second surface 12, the second surface 12 being opposite to the first surface 11, wherein the thermal emitting membrane 1 is arranged to be heated to a thermal emission temperature so that the first and second surfaces 11, 12 radiate light 100 at the thermal emission temperature. The size and the proportion of the different elements illustrated in FIG. 1 are just indicative and do not necessarily correspond to the real size respectively proportion.

According to the invention, the emissivity s of a surface, for example of the first surface 11, is lower than 0.7. In one embodiment, the membrane 10 is monolithic. If the membrane 10 is monolithic, then the second surface 12 will have the same emissivity ε of the first surface 11. In one embodiment, the first and second surfaces 11, 12 are made by the same material. In another embodiment, the first and second surfaces 11, 12 are made by different materials, but having both an emissivity lower than 0.7. Non limitative examples of material having an emissivity lower than 0.7 in the IR and visible spectrum comprises a refractory material, e.g., a refractory metal and their alloys. Examples of refractory metals are Tungsten, Titanium, Hafnium, Zirconium, Tantalum, Molybdenum and their Nitrides, Oxides and Carbides.

Although the first and second surfaces 11, 12 have been represented as parallel, this is not essential for the invention. Although the first and second surfaces 11, 12 have been represented as substantially plate-like, again this is not essential for the invention. However, the invention is particularly adapted for a flat thermal emitting membrane 10.

In the illustrated embodiment, the thermal emitting membrane 10 is a single piece membrane. In another embodiment (not illustrated), the thermal emitting membrane 10 is a multi-layer membrane, i.e., it comprises at least one layer (of a different material) between the first and second surfaces 11, 12.

In the embodiment of FIG. 1, the thermal emitter device 1 comprises a plurality of resistive arms 4 connected to the thermal emitting membrane 10. In the embodiment of FIG. 1, the resistive arms 4 connect the thermal emitting membrane 10 to a support 13. The thermal emitting membrane 10 is suspended by the resistive arms 4, and it is heated to a thermal emission temperature via those resistive arms 4.

According to the invention, the thermal emitter device 1 comprises also a lens 2. The lens 2 comprises a lens entry surface 21, which faces the first surface 11 of the thermal emitting membrane 10 in FIG. 1. The lens 2 comprises a lens exit surface 22, opposite to the lens entry surface 21.

In the embodiment of FIG. 1, the lens entry surface 21 is substantially flat and the lens exit surface 22 comprises a curved portion 24, in particular a convex portion 24.

In the embodiment of FIG. 1, the lens is monobloc and made by the same material. In other embodiments, the lens could comprise two or more pieces and/or could be made of different materials. In one embodiment, a (piano-convex) lens is placed on the lid, e.g. with glue or any other adapted fixation means.

In the embodiment of FIG. 1, the thermal emitting membrane 10 is placed in a housing 8 defined by the lens 2 and the support 13. In one embodiment, this housing 8 comprises vacuum or a controlled atmosphere e.g., without oxygen or other gases which would react with the emitting material at high temperature.

According to the invention, the lens 2 has a reflectivity normal to a lens surface, e.g., the lens entry surface 21, comprised in the range 4% to 40%, so as to partially reflect the radiated light.

According to one embodiment, the lens 2 is made of glass, silicon, sapphire, quartz, germanium, and/or a MID-Far thermal material, such as $CaF2$, $MgF2$, ZnSe, ZnS, NaCl thermal.

According to the invention, the distance d between the lens entry surface 21 and the first surface 11 of the thermal emitting membrane 10 is equal or lower than L/4, where Lisa major dimension of the thermal emitting membrane 10.

If the thermal emitting membrane 10 has a rectangular section, its major dimension L is the longer side of the rectangular section. If the thermal emitting membrane 10 has a circular section, its major dimension L is the diameter of the circular section.

In other words, according to the invention the lens 2 is placed really "close" to the thermal emitter device 10. In this way, a part of the light reflected by the lens 2 is reabsorbed by the thermal emitting membrane 10, and another part of the light reflected by the lens 2 is reflected by the thermal emitting membrane 10 toward the lens 2, having therefore another chance to go through the lens: this allows to increase the efficiency and/or the lifetime of the thermal emitter device.

According to one embodiment, the distance d between the lens entry surface 21 and the first surface 11 of the thermal emitting membrane 10 is equal or lower than L/8. In this embodiment, the lens 2 is closer to the thermal emitting membrane 10, thereby increasing more the efficiency and/or the lifetime of the thermal emitter device.

In one embodiment, the thermal emitter device 1 comprises a lid and the lens 2 is placed in or on the lid.

Using a lens 2 close to the thermal emitting membrane 10 changes the angle dispersion of the thermal emitted light. The refraction at the interface between the housing 8 and the lens entry surface 21 allows to convert all angles, so that all light propagates at angles less than a maximum angle related to the angle of total internal reflection at surface 21 due to the material of the lens 2*a*. For example, if the lens is made of glass, the maximum angle is about 40°; if the lens 2 is made of in silicon, the maximum angle is about 16°.

Figure 2:
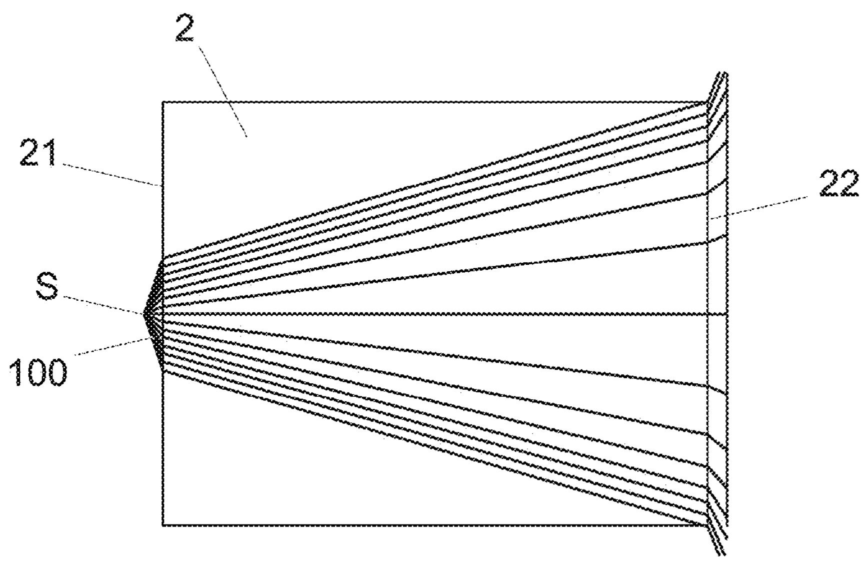
FIG. 2 illustrates a cut view of a lens of a thermal emitter device according to another embodiment of the invention.

FIG. 2 illustrates a cut view of a lens 2 of a thermal emitter device according to another embodiment of the invention. In this embodiment, the lens 2 is made by silicon and comprises an entry surface lens 21 and an exit surface lens 22 substantially parallel to the entry surface lens 21, both the entry surface lens 21 and the exit surface lens 22 being substantially flat.

By assuming a Lambertian source S emitting at, for example, a wavelength of 1.5 microns with a random polarization (and schematically representing a thermal emitting membrane 10), then about 32% of the light is lost at the lens entry surface 21 due to reflection. A slightly smaller fraction 27% is lost at the lens exit surface 22. The total transmission of the lens therefore 50%:

$$0.5=(1.000-0.315)\times(1.00-0.27) \quad (1)$$

Instead of considering this loss as a drawback to be improved, e.g., by using anti-reflective coating, the thermal emitter device 1 according to the invention exploits those reflections, by using a thermal emitting membrane 10 which is not a perfect blackbody.

The thermal emitting membrane 10 has emissivity of lower than 0.7, depending on wavelength and material. This means it has a reflectivity of 30% or higher. According to the invention, the thermal emitting membrane 10 is placed close to the lens: therefore, the light reflected from the lens 2 will hit the first surface 11 of the thermal emitting membrane 10, and either be reabsorbed by the thermal emitting membrane 10 or reflected by the thermal emitting membrane 10 towards the lens, which then has a second chance to go through the lens 2.

Let $T_{lens}$ being the transmission of the first surface of the lens 21, then the light transmitted at the first pass is simply $T_{lens}$. Let $R_{lens}$ being the light reflected by the lens. After reflection $R_{lens}$ from the thermal emitting membrane 10 with reflectivity $R_{emitter}$ then after one round trip and additional $R_{lens}R_{emitter}$ of light will impinge on the lens 2. Therefore, the total light transmitted after first pass and a single round trip is $$T_{lens}(1+R_{lens}R_{emitter}) \quad (2)$$

and after n round trips it becomes $$T_{lens}(1+R_{lens}R_{emitter}(R_{lens}R_{emitter})^2+\ldots(R_{lens}R_{emitter})^n) \quad (3)$$

Table 1 indicates the total light transmitted after a certain number of round trips, for a thermal emitter device having an emissivity equal to 0.4 and a reflectivity $R_{emitter}$ equal to 0.6, and Table 2 indicates the total light transmitted after a certain number of round trips, for a thermal emitter device having an emissivity equal to 0.2 and a reflectivity $R_{emitter}$ equal to 0.8:

TABLE 1

| No of round trips | Transmission |
|---|---|
| 0 | 68.49% |
| 1 | 81.43% |
| 2 | 83.88% |
| 3 | 84.35% |
| N | 84.45% |

TABLE 2

| No of round trips | Transmission |
|---|---|
| 0 | 68.49% |
| 1 | 85.75% |
| 2 | 90.10% |
| 3 | 91.20% |
| N | 91.57% |

These two examples show that most a considerable improvement in transmission occurs via reflection from the thermal emitting membrane 10. As discussed, there is also an additional gain in that the remaining power is not truly lost as it is absorbed by the thermal emitting membrane 10 and therefore increases its efficiency.

The applicant has found that two round trips are enough to give most of the gain from light being reflected from thermal emitting membrane 10. A "close" distance between the lens 2 and the thermal emitting membrane 10 have been defined based on those considerations.

Figure 3:
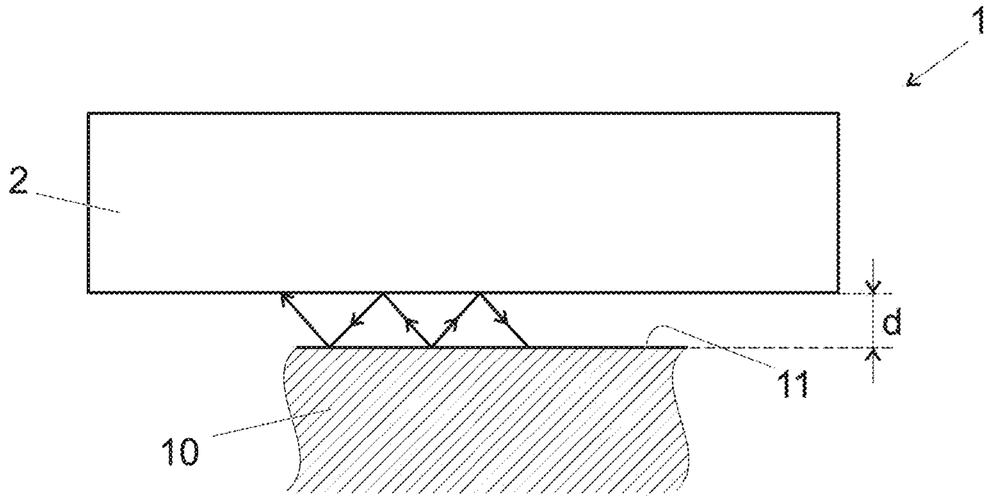
FIG. 3 illustrates a cut view of a thermal emitter device according to another embodiment of the invention.

FIG. 3 illustrates a cut view of a thermal emitter device 1 according to another embodiment of the invention.

Complete numerical simulations with ray-tracing software performed by the applicant with a thermal emitter device according to the invention, a lens 2 having an index of refraction of 3.5 and a thermal emitting membrane 10 having an emissivity of 0.4 show that up to 84.4% of thermal emitted light can be transmitted thought the lens 2, and the other 15.4% is absorbed by the thermal emitting membrane 10.

A similar advantage can be obtained by exploiting the lens exit surface 22, as long as the lens 2 is "thin". In other words, the thickness of the lens 2 is such that lens exit surface 22 can also be deemed as being close to lens entrance surface 21 as defined above.

Complete numerical simulations with ray-tracing software performed by the applicant show that the transmission through the thermal light emitting device according to the invention is enhanced if the lens 2 itself is "thin".

In this context, a lens 2 is "thin" if the lens apparent thickness is less than L/4 (or L/8). In this embodiment, the distance between the lens entry surface 21 and the surface 11 of the thermal emitting membrane, is less than L/4 (or L/8).

Figure 4:
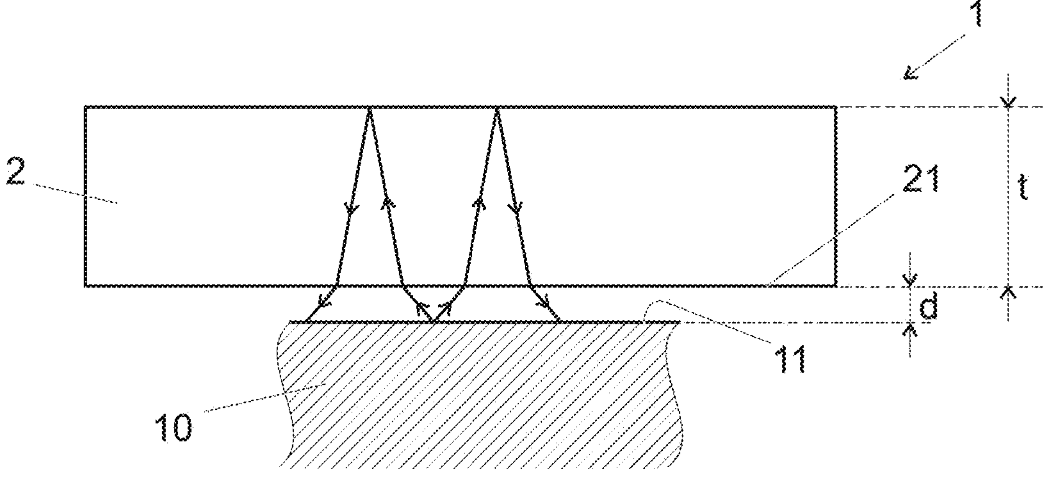
FIG. 4 illustrates a cut view of a thermal emitter device comprising a "thin" lens, according to another embodiment of the invention.

FIG. 4 illustrates a cut view of a thermal emitter device 1 comprising a "thin" lens 2, according to another embodiment of the invention. The refractive index of the lens 2 is taken to be around 3.5 in FIG. 4.

For example, with a lens material with an index of refraction of 3.5, light at 45° is refracted to 11.6°. The tan of 11.6° is 0.2. More specifically, the thickness is the apparent thickness of the lens when viewed at 45°. For example, if the refractive index, n, is 3.5 then the scale factor is 0.21, so the window appears 0.21 times closer than in reality. For n=1.5, the scale factor is 0.53.

Complete numerical simulations with ray-tracing software performed by the applicant with a thermal emitting membrane 10 of 100 μm in diameter show that the lens entry surface 21 should be 20 μm away from its first surface 11 for it to be close. The scaled thickness of the thin lens should be likewise 20 μm. For an index of 3.5 this would mean that the real thickness of the lens could be 20/0.21=95 μm.

In one embodiment, the entry and the lens exit surfaces 21, 22 of a "thin" lenses 2 are substantially flat.

Figure 5:
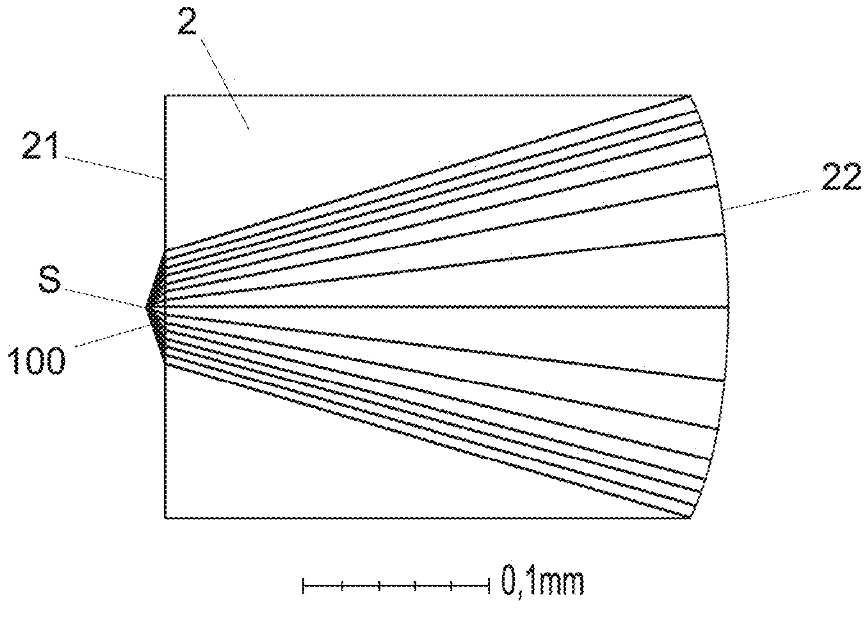
FIG. 5 illustrates a cut view of a "thick" lens of a thermal emitter device according to another embodiment of the invention.

FIG. 5 illustrates a cut view of a "thick" lens 2 of a thermal emitter device according to another embodiment of the invention. The showed map scale gives just an indication of a possible size of the "thick" lens 2 and should not be considered as limitative.

In the embodiment of FIG. 5, the lens exit surface 22 is (at least partially) curved, so as to refocus via reflection at least part of the light back onto the thermal emitting membrane 10. In one embodiment, at least a portion of the lens exit surface 22 is convex. In the embodiment of FIG. 5, all the lenses exit surface 22 is convex.

Tests performed by the applicant show that the net transmission with a "thick" lens 2 can be estimated to be about 71% with the remaining 29% being reabsorbed by the thermal emitting membrane 10.

There is an additional advantage to use a lens 2 comprising an exit curved lens exit surface 22. Not only does it enhance the efficiency of the thermal emitter device 1, but it also makes the emission more directional.

Tests performed by the applicant show that for a lens having an index of refraction of 3.5, the angular spread of the light beams is +/−11.6° simply by refraction at the lens entry surface. The numerical aperture NA of the thermal emitting membrane 10 has been changed from 0.95 to about 0.2, which has a huge advantage in many applications as no other external optical elements are needed.

In one embodiment, the thermal emitter device 1 comprises an external optics to collimate further the emitted light.

Figure 6:
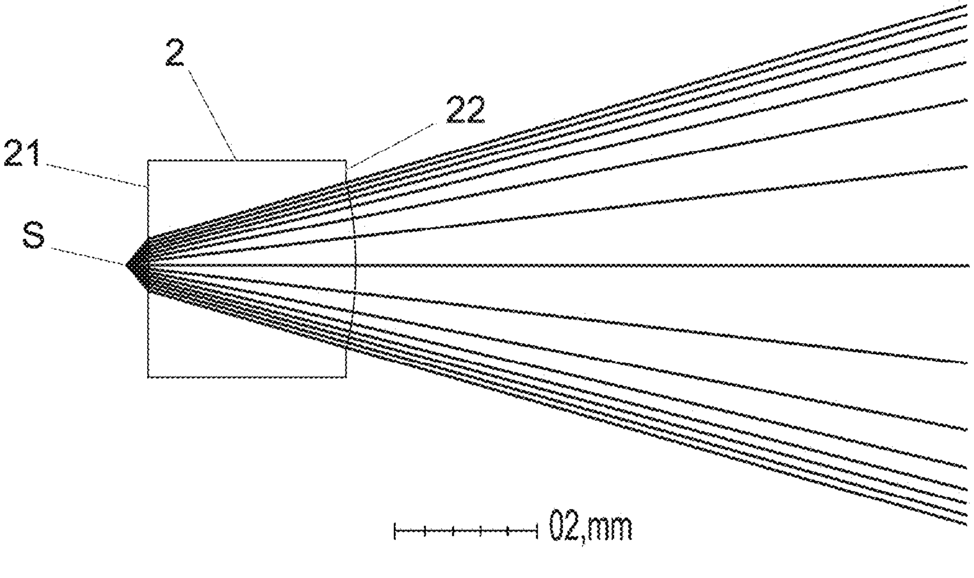
FIG. 6 illustrates a cut view of the "thick" lens of a thermal emitter device of FIG. 5, with an embodiment of the light propagation beyond the lens exit surface.

FIG. 6 illustrates a cut view of the "thick" lens 2 of a thermal emitter device 1 of FIG. 5, with an embodiment of the light propagation beyond the lens exit surface. In the illustrated embodiment, the beams are not deviated at the lens exit surface 22. In another (not illustrated) embodiment, the beams could be deviated at the lens exit surface 22. The showed map scale gives just an indication of a possible size of the "thick" lens 2 and should not be considered as limitative.

In order to restrict the opening of the lens 2, it is possible to either change the shape of the lens 2 or put a mirror on a portion part of the exit surface 22 of the lens. This mirror will block light and reflect it back onto the thermal emitting membrane 10, with the double advantage that the light can be reflected from the thermal emitting membrane 10 or reabsorbed in the thermal emitting membrane 10.

Figure 7:
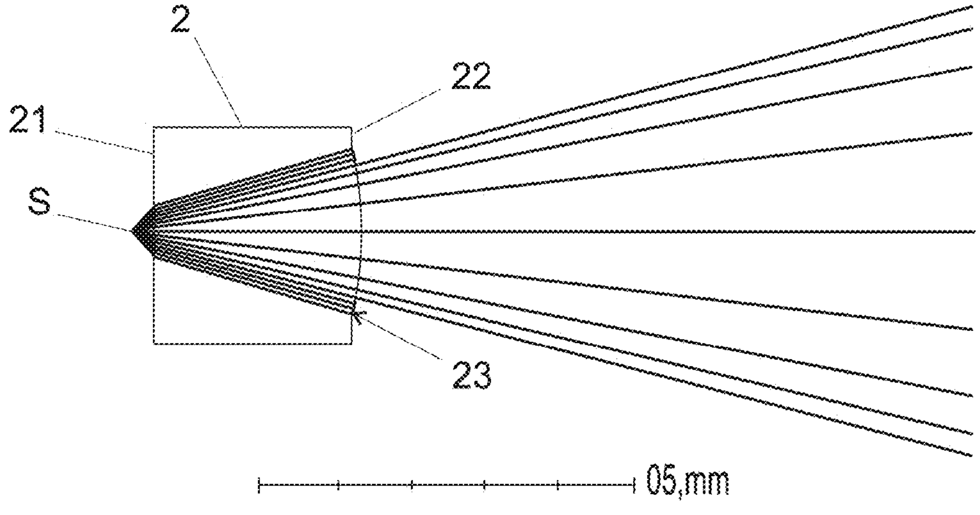
FIG. 7 illustrates a cut view of a "thick" lens of a thermal emitter device and a mirror on a portion of the lens exit surface, according to another embodiment of the invention.

FIG. 7 illustrates a cut view of a "thick" lens 2 of a thermal emitter device, comprising a mirror on a portion 23 of the lens exit surface 22, according to another embodiment of the invention. The showed map scale gives just an indication of a possible size of the "thick" lens 2 and should not be considered as limitative.

In the embodiment of FIG. 7, the lens exit surface 22 comprised a curved portion 24. The mirror 23 is placed at the two ends of the curved portion 24, by restricting therefore the exit angle of the light beam, thereby improving its directionality.

In one preferred embodiment, the thermal emitting membrane 10 (not visible in FIG. 7) is curved. This allows to increase more the number of trips on the emitted light in the lens 2.

In order for the light reflected from the mirror 23 on the lens 2 and for the light reflected from the thermal emitting membrane to escape, in one embodiment, the mirror portion 23 is slightly defocused, i.e., the emitter is not placed at the exact focal point, the blur should remain small on a scale of the emitter dimension; in another embodiment, the thermal emitting membrane is slightly curved (bowed upwards towards the lens), so that the light reflected from the mirror 23 does not retract exactly the original path. The bowing should be small on the scale of the scale of the emitter dimension.

Tests performed by the applicant show that a bowed mirror 23 couples the light reflected from the mirror 23 into the escape cone, thereby directly improving the efficiency of the thermal emitter device.

In one embodiment, the mirrored portion 23 comprises an off-axis aperture on the exit lens surface. This allows to improve the device emissivity.

In one embodiment, the device emissivity is improved by using a using a (cold) mirror.

Figure 8:
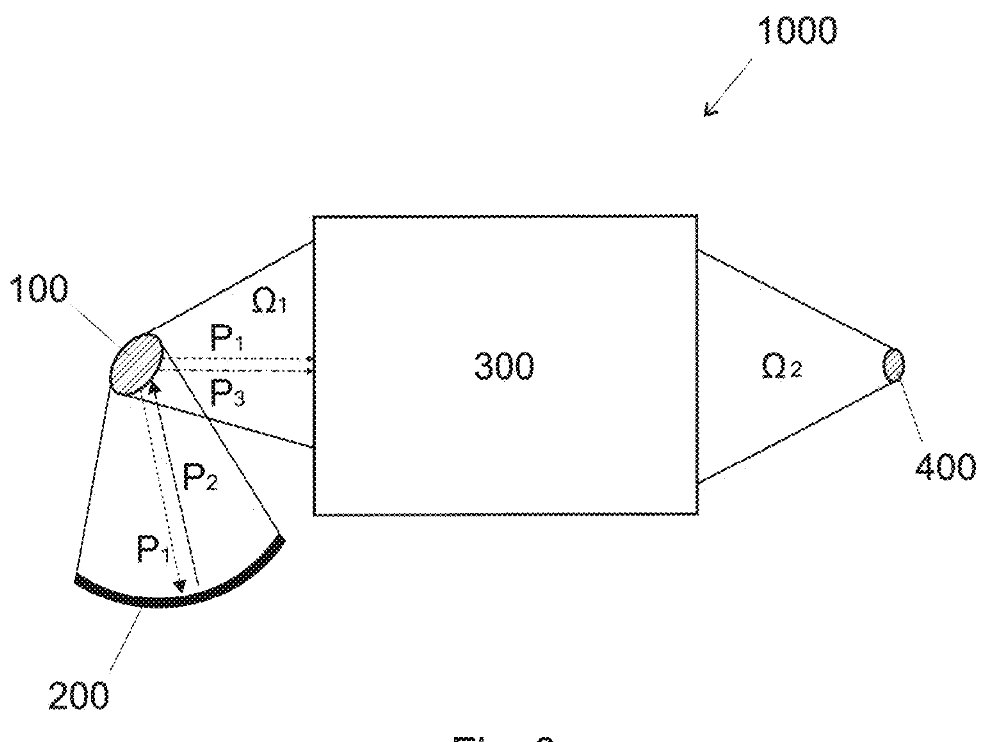
FIG. 8 illustrates schematically a thermal emitter system comprising a cold mirror, i.e., with a mirror that does not emit at the wavelength of interest.

FIG. 8 illustrates schematically a thermal emitter system 1000 comprising a cold mirror 200, i.e., with a mirror that does not emit at the wavelength of interest. Although in FIG. 8 the mirror is illustrated as a curved one, the invention is not limited to a curved mirror, but include any shape of mirrors, comprising e.g., flat mirrors. The size and the proportion of the different elements of FIG. 8 are just indicative and do not necessarily correspond to the actual size respectively proportion. The same applies to the inclination of the depicted arrows.

For an absorbing material $\varepsilon=1-R_m$, where $R_m$ is the reflectivity of the material. By reflecting some of the light emitted from the material back off the same surface, then it is possible to increase the effective emissivity.

This embodiment is based on the reflection by the cold mirror 200 of some of the light emitted from the first thermal emitter device 100 back off the same surface, in order to increase the effective emissivity or the first thermal emitter device 100.

Let $P_1$ being the power emitted by the first thermal emitter device 100 towards the optic 300 and towards the mirror 200. Then:

$$P_1=\varepsilon\cdot dA_1\cdot\Omega_1 \tag{4}$$

The power reflected back by the cold mirror 200 having a reflectivity R towards the first thermal emitter device 100 is then equal to:

$$P_2=R\cdot\varepsilon\cdot dA_1\cdot\Omega_1 \tag{5}$$

The power $P_2$ reflected back by the cold mirror 200 is then reflected by the emitter as $P_3$:

$$P_3=R_m\cdot R\cdot\varepsilon\cdot dA_1\cdot\Omega_1 \tag{6}$$

where $R_m$ is the reflectivity of the material of the first thermal emitter device 100.

Therefore, the total power towards the optics 300 is $P_1+P_3$ and is equal to:

$$P_1+P_3=\varepsilon\cdot dA_1\cdot\Omega_1(1+R_m\cdot R) \tag{7}$$

The total emission power is conserved, less possible loss in the mirror 200. The power towards optic can never exceed $dA_1 \cdot \Omega_1$, so that the second law of thermodynamics is satisfied.

The thermal emitter device according to one embodiment of the invention is an implementation of the idea depicted in FIG. 8.

Figure 9:
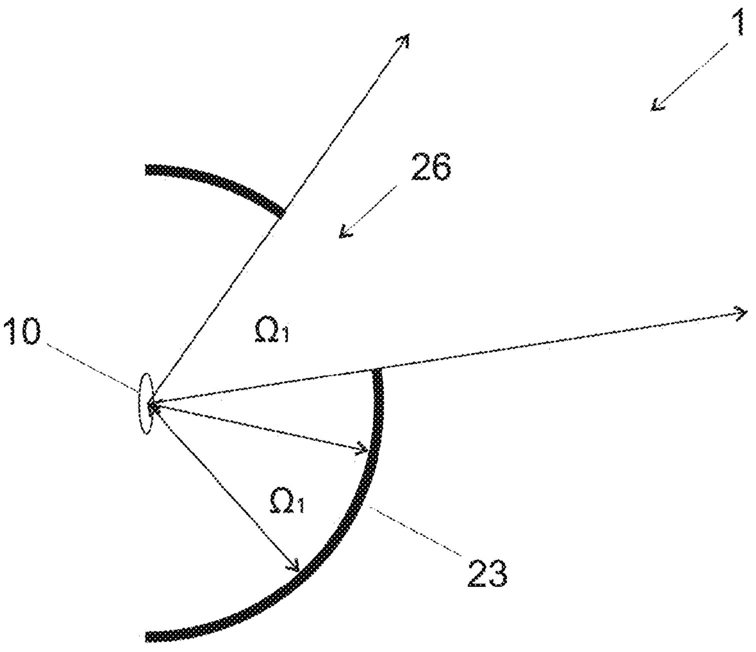
FIG. 9 illustrates a cut view of a thermal emitter device according to one embodiment of the invention, comprising an off-axis mirror on the lens exit surface.

FIG. 9 illustrates a cut view of a thermal emitter device 1 according to one embodiment of the invention, comprising an off-axis mirror 23. The mirror comprises an opening 26. The thermal emitter device 1 of FIG. 9 comprises also a (not-illustrated) lens, according to the disclosure.

In the embodiment of FIG. 9, the emission in a cone $\Omega_1$ towards the mirror 23 is reflected back on to the thermal emitting membrane 10. Part of the power is reabsorbed in the thermal emitting membrane 10 and part of the power is reflected out through the opening 26, which sums with the original power emitted towards the opening 26, thus enhancing the power out.

Figure 10:
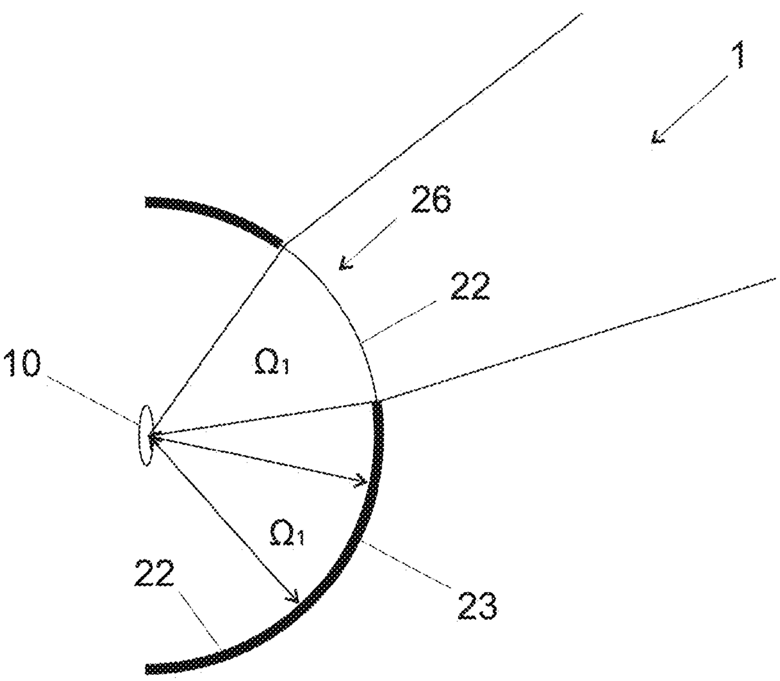
FIG. 10 illustrates a cut view of a thermal emitter device according to another embodiment of the invention, comprising an off-axis mirror on the lens exit surface.

FIG. 10 illustrates a cut view of a thermal emitter device 1 according to another embodiment of the invention, comprising an off-axis mirror on the lens exit surface 22.

In this embodiment, the opening 26 is on the lens exit surface 22 22 so the light is more directional. This embodiment combines the advantage of a (close) lens (to collect angles) along with the mirror 23 to reflect light off the sample.

Figure 11:
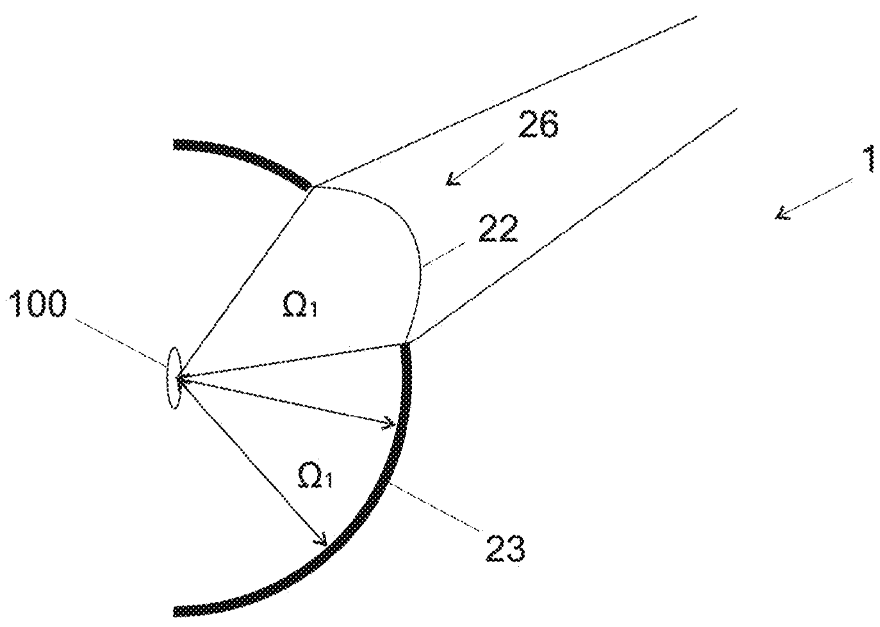
FIG. 11 illustrates a cut view of a thermal emitter device according to another embodiment of the invention, comprising an off-axis mirror on the lens exit surface.

FIG. 11 illustrates a cut view of a thermal emitter device 1 according to another embodiment of the invention, comprising an off-axis mirror on the lens exit surface 22.

In this configuration, the opening could have a different shape to the rest of the lens 2, in order to control the light further.

Figure 12:
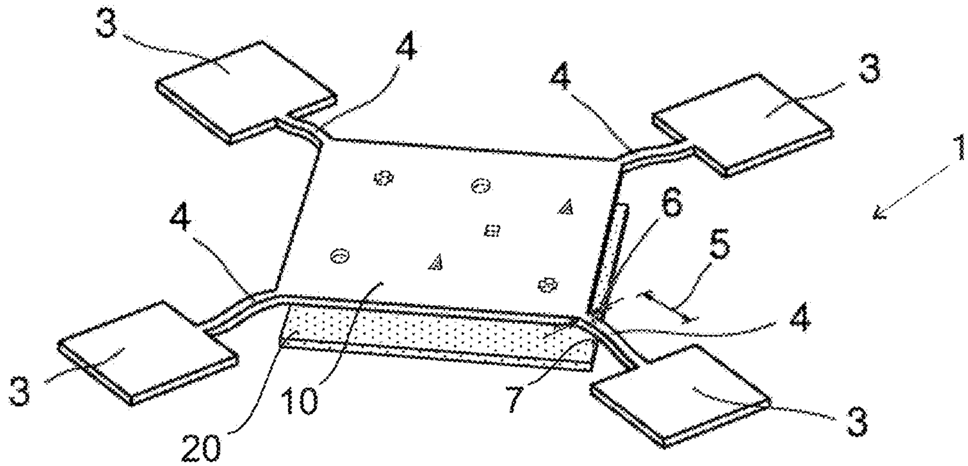
FIG. 12 shows a perspective view of a thermal emitter device according to another embodiment of the invention.

FIG. 12 shows an example of a thermal emitter device 1 according to the invention, wherein the thermal emitting membrane 10 comprises a plurality of resistive arms 4 connected to the thermal emitting membrane 10, wherein the thermal emitting membrane 10 is suspended by the resistive arms, wherein the thermal emitting membrane 10 is heated to a thermal emission temperature via those resistive arms 4. Each of the arms 4 in the illustrated example of FIG. 12 has a length 5, a width 6 and a thickness 7, and a cross-sectional area which is much smaller than that of the membrane 10. The connection pads 3 are designed to provide mechanical connection to a substrate such that the membrane 10 is only supported relative to the substrate by the arms 4 and pads 3. The connection pads 3 provide electrical connection to the arms 4, and thereby to the membrane 10. The membrane 10, pads 3 and arms 4 are preferably made of a single contiguous piece of material. Other features and other embodiments of this thermal emitter device 1 and/or of this emitting membrane 10 are described in the documents WO2020012042, WO2021144463 or WO2021144464 filed by the applicant and enclosed here by reference.

In the embodiment of FIG. 12 the membrane 10 comprises different holes, as described in the patent application having the application number EP20220155542 filed by the applicant, and here enclosed by reference.

The presence of the holes on the membrane 10 as described in the patent application having the application number EP20220155542 is not limited to the embodiment of FIG. 12, but it applies also to the other embodiment of the present invention which comprise a mirror.

REFERENCE SIGNS USED IN THE FIGURES

1 Thermal emitter device
2 Lens
3 Connection pad
4 Arm
5 Length of the arm
6 Width of the arm
7 Thickness of the arm
8 Housing
10 Thermal emitting membrane
11 First surface
12 Second surface
13 Support
21 Entry lens surface
22 Exit lens surface
23 Mirrored portion
24 Curved portion
26 Opening
20 Cold mirror
100 Emitted light
200 Cold mirror
300 Optics
400 Second thermal emitter device
1000 Thermal emitter system
d Distance
$P_1, \ldots P_j$ Powers
t Thickness of the lens
S Lambertian source
$\Omega_1$, $\Omega_2$ Solid angles

The invention claimed is:

1. A thermal emitter device, comprising:

a thermal emitting membrane comprising a surface, wherein the thermal emitting membrane is arranged to be heated to a thermal emission temperature so that the surface radiates IR or visible light, wherein the emissivity of the surface is lower than 0.7, a lens, comprising a lens surface, the lens surface facing the surface of the thermal emitting membrane, and having a reflectivity normal to the lens surface comprised in the range 4% to 40%, so as to partially reflect the radiated IR or visible light, wherein the distance between the lens surface and the surface is equal or lower than L/4, where L is a major length of the thermal emitting membrane, so that a part of the IR or visible light reflected by the lens is reabsorbed by the thermal emitting membrane, and another part of the IR or visible light reflected by the lens is reflected by the thermal emitting membrane toward the lens, having therefore another chance to go through the lens, thereby increasing the efficiency of the thermal emitter device.

2. The thermal emitter device according to claim 1, wherein the distance between the lens and the surface is equal or lower than L/8.

3. The thermal emitter device according to claim 1, wherein the lens is made of glass, silicon, sapphire, quartz, germanium, and/or a MID-Far thermal material, such as $CaF_2$, $MgF_2$, ZnSe, ZnS, NaCl, thermal.

4. The thermal emitter device according to claim 1, comprising a lid and the lens is placed in or on the lid.

5. The thermal emitter device according to claim 1, wherein the thermal emitting membrane is made by or comprises a refractory material, e.g., a refractory metal and/or an alloy of refractory metals and/or a refractory ceramic.

6. The thermal emitter device according to claim 1, wherein the lens apparent thickness of the lens is equal or lower than L/4.

7. The thermal emitter device according to claim 1, wherein the lens apparent thickness of the lens is higher than L/4.

8. The thermal emitter device according to claim 7, the lens surface being a lens entry surface, the lens comprising a lens exit surface, the lens exit surface being at least partially curved so as to refocus the light back to the thermal emitting membrane and/or for making the emission more or less directional.

9. The thermal emitter device according to claim 7, comprising a mirror on at least a portion of the lens surface.

10. The thermal emitter device according to claim 9, the mirror being an off-axis mirror.

11. The thermal emitter device according to claim 9, the mirror being a cold mirror.

12. The thermal emitter device according to claim 9, the mirror comprising an opening.

13. The thermal emitter device according to claim 12, a portion of the lens facing the opening having a shape different from the shape of the lens which does not face the opening, in order to control the emitted light further.

14. The thermal emitter device according to claim 1, comprising a plurality of resistive arms connected to the thermal emitting membrane, wherein the thermal emitting membrane is suspended by the resistive arms, wherein the thermal emitting membrane is heated to a thermal emission temperature via said resistive arms.

15. The thermal emitter device according to claim 9, wherein the surface is a first surface, the device comprising a second surface being opposite to the first surface, wherein the thermal emitting membrane is arranged to be heated to a thermal emission temperature so that the first and second surfaces radiate IR or visible light, wherein the mirror faces one of the first or second surfaces of the thermal emitting membrane, wherein at least a portion of the thermal emitting membrane comprises through holes, wherein any cross section in a plan parallel to one of the first or second surfaces of the thermal emitting membrane of said holes has a maximum dimension larger than the longest wavelength of said predefined region, wherein the sum of the areas of the holes is at least 10% of the area of each of the first or second surfaces of the thermal emitting membrane.

* * * * *